US006785710B2

(12) United States Patent
Kikinis

(10) Patent No.: US 6,785,710 B2
(45) Date of Patent: * Aug. 31, 2004

(54) E-MAIL CLIENT WITH PROGRAMMABLE ADDRESS ATTRIBUTES

(75) Inventor: Dan Kikinis, Saratoga, CA (US)

(73) Assignee: Genesys Telecommunications Laboratories, Inc., Daly City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,741

(22) Filed: Jun. 22, 1998

(65) Prior Publication Data

US 2001/0044828 A1 Nov. 22, 2001

(51) Int. Cl.[7] .............................................. G06F 15/16
(52) U.S. Cl. ...................................................... 709/206
(58) Field of Search ................................ 709/206, 207; 707/1, 10

(56) References Cited

U.S. PATENT DOCUMENTS

| | | | | |
|---|---|---|---|---|
| 5,765,033 A | * | 6/1998 | Miloslavsky | 709/200 |
| 5,822,526 A | * | 10/1998 | Waskiewicz | 709/206 |
| 5,878,230 A | * | 3/1999 | Weber et al. | 395/200.68 |
| 5,905,863 A | * | 5/1999 | Knowles et al. | 395/200.36 |
| 5,938,725 A | * | 8/1999 | Hara | 709/206 |
| 6,018,761 A | * | 1/2000 | Uomini | 709/206 |
| 6,128,646 A | * | 10/2000 | Miloslavsky | 358/402 |

OTHER PUBLICATIONS

Chaum, David L., "Untraceable Electronic Mail, Return Addresses, and Digital Pseudonyms", Feb. 1981, Communications of the ACM, vol. 24, No. 2, pp. 84–88.*

* cited by examiner

*Primary Examiner*—David Davis
(74) *Attorney, Agent, or Firm*—Donald R. Boys; Central Coast Patent Agency, Inc.

(57) ABSTRACT

An e-mail processing application executable on a computer station having a video display unit (VDU) searches a received e-mail for one or more words, phrases, and addresses for comparison with stored words, phrases and addresses in a stored table, and upon finding a match in the stored table, inserts one or more of words, phrases, or addresses associated in the stored table with the words, phrases or addresses from the received e-mail in any reply to the received e-mail. In a preferred embodiment a "send to" address in a received e-mail triggers automatically one or both of a particular "from" and "reply to" address in any response to the received e-mail. In an alternative embodiment, a "send to" address in a received e-mail, as a result of a table look-up, automatically prepares and sends a new e-mail identical to the received e-mail except for a new "send to" address retrieved from the stored table. In alternative embodiments the application simply provides variable fields in a reply window for a user to enter variable "from" and "reply to" addresses.

16 Claims, 2 Drawing Sheets

E-MAIL CLIENT WITH PROGRAMMABLE ADDRESS ATTRIBUTES

CROSS-RELATED DOCUMENTS

The present invention is related in part to prior U.S. Pat. No. 5,765,033 issued on Jun. 9, 1998 to inventor Alec Miloslavsky entitled System for Routing Electronic Mails. The disclosure of the prior application is incorporated herein by reference.

FIELD OF THE INVENTION

The present invention is in the field of e-mail communication and pertains more particularly to methods and apparatus for providing an enhanced e-mail client having programmable multi-address attributes.

BACKGROUND OF THE INVENTION

Electronic mail (e-mail) has become one of the most commonly used communication tools in business and in the home. E-mail comprises electronic documents having a particular protocol for addressing, such as "send to". "from", and "reply to" addresses, and requires compatible software applications on the part of both sender and recipient for handling the protocol. Such an application in the art is termed an e-mail client, and this term will be used frequently in the present application, meaning the control routines used for processing e-mails, including reading, replying, and the like.

Typically, an e-mail message is temporarily stored in an e-mail server connected to a data-network, and users may retrieve the stored messages from such a server at their convenience. Most e-mail clients allow a wide variety of options to a user regarding such e-mail attributes as language type, encryption methods, list mailing capability, document attaching capability, profile options, and so on. Also, user and client information may be easily stored in an address book (database) for simple retrieval and implementation.

Although many companies recognize the benefit of using e-mail, some of them have only recently installed e-mail systems. One reason for this is because e-mail applications of current art are largely proprietary and some do not communicate using the same protocol as another application. Therefore, additional steps may be required by a sender to configure his or her e-mail so that a particular receiver using a variant application may be able to read it. Often, these prerequisites are forgotten when a user sends an e-mail to a recipient necessitating a resend of the same message. More recently, however, e-mail protocol has become much more standardized, and e-mails may typically be processed over different networks and through different servers and services.

Recently, too, many companies and homes have been connected to the Internet, which is a world-wide public data network connecting tens of millions of computers. One of the reasons for the Internet's popularity is that the cost of access is very low. Another reason is that the Internet offers many resources in addition to e-mails. Each user of the Internet is typically assigned an e-mail address that is recognizable around the world. A computer connected to the Internet, having an e-mail client installed, can send e-mails to any one of these e-mail addresses, however, the proprietary nature of the client software may still require additional steps to be taken before one can send a message to a recipient using a variant application such as initiating variable coding, and so on.

As a result of the popularity and convenience of e-mails, particularly over the Internet, some companies now encourage their customers to send comments and request information and services using e-mails. Typically, these companies set up one or more specific e-mail addresses for these purposes, such as sales@xyz.dom, support@xyz.dom etc., and e-mail servers handling incoming mails may be a part of telephony call centers wherein agent stations are enabled with computer stations connected to the e-mail server.

In such e-mail systems there is still a pronounced problem and unmet need that may occur under certain conditions. For example, in some call-center environments wherein e-mail is supported, a number of agents may represent a number of different companies, being responsible for all communication including e-mail with the customers of those companies. In such a call center, it is desirable that agents be able to respond to customers with an e-mail reply having a "from" and a "reply to" address which refers to the company the customer has addressed originally.

The present problem is, that with current art e-mail clients, the return address is a default of the client for a profile, in some cases, and not a variable that an agent can manipulate, or that may change automatically depending on some attribute of a received message, without restarting the client, which can be very time consuming. When replying to a customer, default settings automatically insert the default "from" and "reply to" e-mail address into the reply. While most current art e-mail clients support the use of multiple profiles, a user must log-in to each profiles and may use only one at a time. Creating many profiles can be time consuming, and changing profiles during work of answering e-mails is clumsy and inefficient.

What is clearly needed is an e-mail client application that may automatically choose and insert addresses in the appropriate field box of an e-mail reply to an original message, or at least provide selectable options for such addresses to an agent or other user. An application such as this would save time and enable one agent to handle e-mail communications to customers of many different companies, and, in the case of automatic insertion in response to characteristics of an original message, avoid any danger of inserting a wrong or misleading address.

SUMMARY OF THE INVENTION

In a preferred embodiment of the present invention an e-mail application is provided, comprising routines adapted for providing an interactive display on a computer video monitor, the interactive display including a window for displaying a received e-mail from a sender and a window wherein a user may enter a reply to the sender and initiate sending of the reply; a parser for reviewing at least the "send to" address of the received e-mail; and a table look-up function for perusing a stored table relating received "send to" addresses with "reply to" and "from" addresses to be inserted in prepared replies. The application retrieves from the stored table "send to" and "from" addresses to be inserted in prepared replies according to the "send to" address in the received e-mail, and inserts the retrieved addresses in the reply.

In one embodiment the parser is adapted to review the received e-mail message for addresses, words and phrases for comparison to prestored words and phrases in the stored table, and the application is adapted to insert any one of "send to", "from", and "reply to" addresses in a reply to the received e-mail. In an alternative the stored table stores complete reply messages associated with one or more of selected words, phrases, or addresses, and wherein the application is adapted to automatically prepare and send replies with prestored messages and addresses in response to received e-mails containing the selected words, phrases, or addresses. In another alternative, the parser is adapted to retrieve the "send to" address of the received e-mail and to compare same with addresses in a stored table associated with other "send to" addresses, and, finding a match, the application is adapted to forward the received e-mail automatically to the associated "send to" address in the stored table.

In some embodiments the application, finding a match in the stored table with the "send to" address from the received e-mail, the application is adapted to send a new e-mail to the associated "send to" address from the table, inserting the message of the received e-mail.

In alternative embodiments the e-mail client of the invention simply provides variable fields wherein a user may enter "from" and "reply to" addresses in replies to e-mails, either directly or by selection from an address book.

Methods for practicing the invention as well as apparatus are taught in several examples in the descriptions that follow under the title "Descriptions of the Preferred Embodiments."

In another aspect of the invention an e-mail handling system is provided, comprising a computer station having a video display unit (PC/VDU); an interactive display on the VDU having windows for displaying the received e-mail and for preparing a reply e-mail to the received e-mail; e-mail processing routines executable on the computer station, the e-mail processing routines comprising a parser for reviewing at least the "send to" address of the received e-mail; and a table look-up function for perusing a stored table relating received "send to" addresses with "reply to" and "from" addresses to be inserted in prepared replies. The e-mail processing routines retrieve from the stored table "send to" and "from" addresses to be inserted in prepared replies according to the "send to" address in the received e-mail, and inserts the retrieved addresses in the reply.

In a particular embodiment of the system according to the invention the parser is adapted to review the received e-mail message for addresses, words and phrases for comparison to prestored words and phrases in the stored table, and the e-mail processing routines are adapted to insert any one of "send to", "from", and "reply to" addresses in a reply to the received e-mail. In another embodiment the stored table stores complete reply messages associated with one or more of selected words, phrases, or addresses, and the application is adapted to automatically prepare and send replies with prestored messages and addresses in response to received e-mails containing the selected words, phrases, or addresses. In still another embodiment the parser is adapted to retrieve the "send to" address of the received e-mail and to compare same with addresses in a stored table associated with other "send to" addresses, and, finding a match, and the e-mail processing routines are adapted to forward the received e-mail automatically to the associated "send to" address in the stored table. In yet another embodiment of the system, upon finding a match in the stored table with the "send to" address from the received e-mail, the e-mail processing routines are adapted to send a new e-mail to the associated "send to" address from the table, inserting the message of the received e-mail.

In the various embodiments and aspects of the invention taught below in enabling detail, an e-mail client application is provided that may be conveniently used by an agent who may receive e-mails addressed to different companies or organizations, and reply to such messages in a manner that different "from" and "reply to" addresses are inserted automatically as though the one agent were different agents of different organizations. In this manner one agent may represent several different entities without danger of inserting wrong or confusing data in e-mail replies.

In alternative embodiments the e-mail client of the invention simply provides variable fields wherein a user may enter "from" and "reply to" addresses in replies to e-mails, either directly or by selection from an address book.

BRIEF DESCRIPTION OF THE DRAWING FIGURES

DESCRIPTION OF THE PREFERRED EMBODIMENTS

Figure 1:
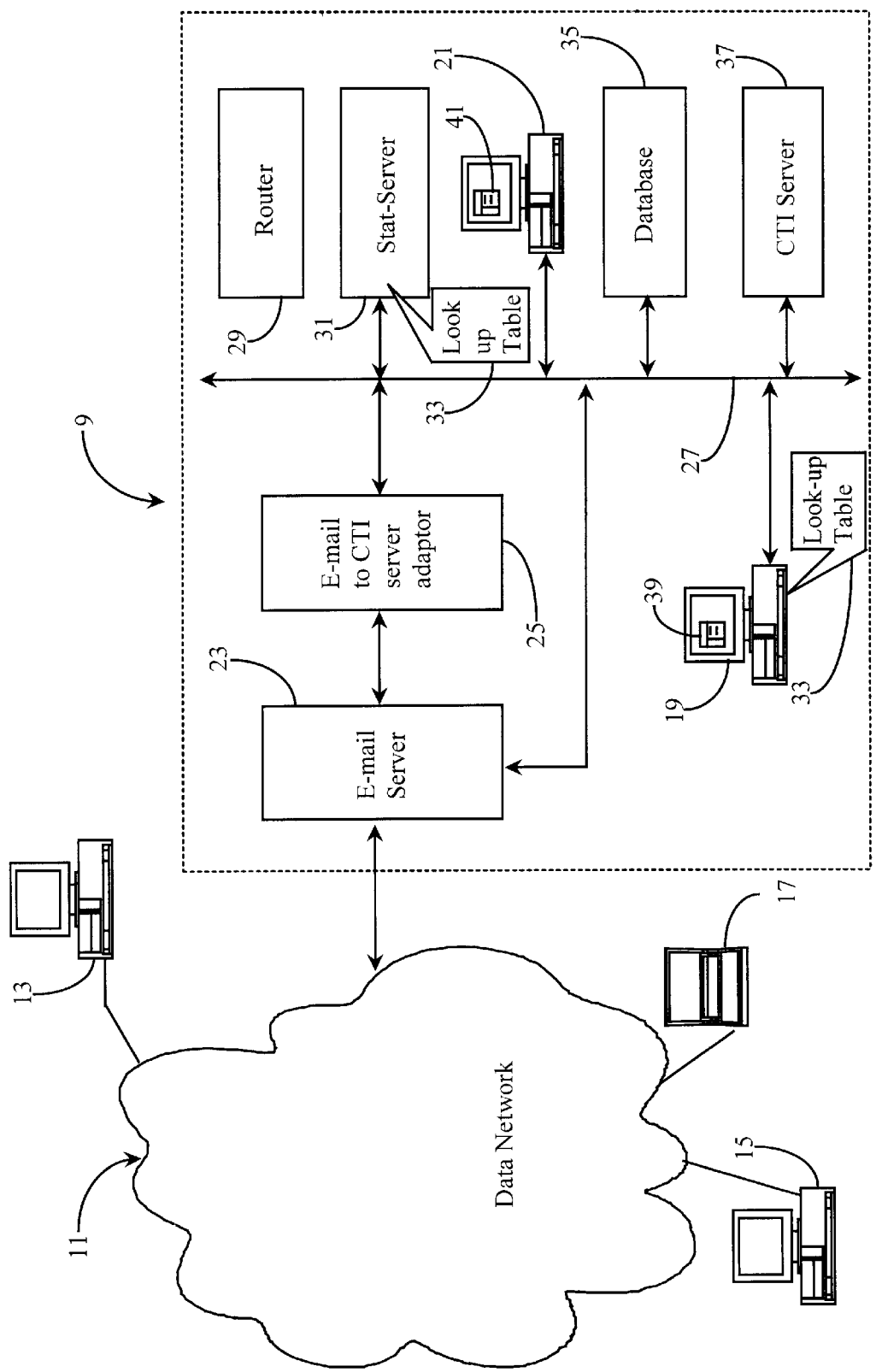
FIG. 1 is a diagram of an e-mail processing center using a multi-addressable e-mail client according to an embodiment of the present invention.

FIG. 1 is a diagram of an e-mail processing center 9 using a multi-addressable e-mail client according to an embodiment of the present invention. E-mail processing center 9 is provided for the purpose of processing, configuring, and routing e-mails arriving from a data network 11 according to U.S. Pat. No. 5,765,033. Center 9 may be part of a computer-enhanced call-center as shown in this embodiment, or may be part of a data network telephony (DNT) center. Data network 11 may be the Internet or another wide area network (WAN) such as a private corporate network.

For the purposes of describing the present invention in its several aspects, assume that e-mail processing center 9 accepts and processes e-mails that are addressed to a plurality of different companies that are, in this case, represented by agents working in a single computer-enhanced call center, which enhancement is referred to in the art as computer-telephony integration (CTI). In such a center any single agent may represent several companies. Customers of various companies may send e-mails addressed to their represented companies via computers such as computers 13, 15, and 17 illustrated as connected through data network 11. Because the companies in question have arranged and contracted to have their inquiries answered via agent personnel at the call center, e-mails addressed to any one of those companies are directed to an e-mail server at the call center by any one of several possible routes or methods not particularly pertinent to the present invention, except that such e-mails arrive at the call center and are distributed to agents at the call center with the "send to" address intact, representing the company to which the customer has directed the e-mail.

An e-mail server to CTI server adapter 25, hereinafter termed CTI adapter 25, is provided in this embodiment for the purpose of creating notification events and changing certain e-mail attributes for routing purposes so that normal CTI routing of e-mails via existing routing software may be performed as described in the prior related U.S. Pat. No. 5,765,033. All e-mails arriving at e-mail server 23 will be routed to available agents based on skill and as otherwise defined with reference to the prior case.

A local area network (LAN) 27 provides connectivity between a host of machines adapted to enable the e-mail routing system. A router 29 is provided for the routing of e-mails to agents operating LAN-connected computers such as computers 21 and 19. A stat-server 31 is provided and maintains statistical information as well as near real-time information regarding agent status, agent responsibilities, language and skill attributes as applied to individual agents, and so on.

A database 35 is provided and contains in this embodiment information regarding customers, products, represented company data, and so on. A CTI server 37 is provided for the purpose of enabling existing telephony applications to communicate with the stat-server 31, router 29, and database 35, and to provide other enhanced services to the call center. A skilled artisan will recognize that there will typically be a telephony switching apparatus with incoming trunks and telephones at agent stations connected to the switching apparatus as well as the computer for handling e-mails, although none of these entities are shown in FIG. 1. Also, as previously described, CTI server 37 may aid in routing e-mails after certain attributes are changed at CTI-server adapter 25.

Once an agent has received notification of a routed e-mail, he may retrieve the actual e-mail from e-mail server 23, or e-mails may be routed automatically to agents based on any of a number of criteria, as described in the prior referenced patent. For the purpose of the present invention the method by which the agents receive e-mails is not particularly relevant.

Agents logged on to the system via connected computers 19 and 21 have e-mail clients 39 and 41 according to an embodiment of the present invention installed and operable. E-mail clients 39 and 41 may be the same software application, different versions of the same application, or different applications that are enhanced with the same functionality as provided according to an embodiment of the present invention. The innovative function of the present invention is functionality of e-mail clients 39 and 41 to choose and insert a correct "from" or "reply to" addresses in the agent's e-mail reply to the original e-mail sent in to the center by the customer, or at least to allow the agent to select alternative addresses.

In a multi-tenant center such as center 9 wherein customers send e-mails to multiple companies that may represented by single agents it is typically not necessary to be able to select "send to" addresses when the agent sends a reply. The e-mail client simply sends the reply to the author, as is usual. However, in the event that there are two or more companies represented by a single agent, an original message from a customer will arrive at e-mail server 23 with the message addressed to a particular company.

The most basic embodiment of the present invention is for the situation of a multi-tenant call center wherein agents may represent and answer e-mails for multiple companies. In this situation it is necessary that an agent be capable of at least manually entering, in a reply to a received e-mail, a "from" and "reply-to" address for the company to which an e-mail he or she answers was originally sent. Therefore, in an embodiment of the invention clients 39 and 41 are enabled to offer an agent, in the process of replying to an e-mail, alternative addresses for insertion in a reply, and alternative addresses for entering into new e-mails he or she may send out for one of the companies represented. The alternatives are stored in a lookup table, such as tables 33, accessible to the agent through the client, and may be presented to the agent in any of a number of forms as known in the art, such as a menu list selectable by a cursor by "point-and-click techniques. Such a table may be at the agents computer or accessible over the LAN connection at, for example, the stat-server or in database 35.

In an alternative embodiment the e-mail client application may automatically make selections from a look-up table 33 according to preprogrammed rules, according to the "send-to" address (for example) in the originally-received e-mail. For example, a parser (part of the module) is utilized to retrieve the "send-to" address, or even other attributes in the received e-mail, such as certain words or phrases in the body of the message. The identifier could be a special code or an order number. The client may use the order number to match that e-mail to the correct company via lookup table 33 which contains, at least, the company's names, e-mail addresses and product-order numbers. The client software may then automatically substitute the appropriate addresses automatically without the agent's concerted attention.

It will be apparent to one with skill in the art that the method and apparatus of the present invention may be practiced in an e-mail processing center connected to a CTI call center, a DNT center, or by users simply connected to a network such as the Internet without departing from the spirit and scope of the present invention. Certain aspects of the client application may be shared such as a parser and a database containing company addresses and perhaps additional information. Those same aspects may, in some embodiments, be contained within the client application on a user's computer. There are many possibilities within the spirit and scope of the invention.

It will also be apparent to one with skill in the art that the unique functions of the present invention may be performed more than once during the processing of an e-mail without departing from the spirit and scope of the present invention. For example, a general client application could reside in e-mail server 23 wherein as instructed via routing decisions, inserts the appropriate e-mail address to a connected agent at his or her computer, such as computer 21 for example.

In an alternative embodiment the system of the invention can enable an agent to forward e-mails automatically to alternative call centers or other companies. Perhaps a received e-mail message is requesting a service that is better provided by a second company to which the first company has an agreement. In this case the "send-to" address on the original message may be changed to a new address of the second company and routed to an agent representing the second company. If it is agreed by the second company that it remain anonymous, perhaps being paid for the service by the first company, then the reply message will use the "from" address of the first company to which the original message was sent, and so on.

This alternative embodiment enables several companies to perform parts of a service such as a complex manufacturing of a product without the customer knowing or being concerned about all of the different companies involved, while at the same time, the customer may receive information directly from agents representing the various companies. This saves time for both the agent representing the first company and the customer who sent the e-mail to that company.

In still another embodiment, the present invention may be practiced without center 9. For example, companies A, B, and C may be required to complete an order for machined parts that was placed by a customer to a company D represented by an agent working at home and advertising on the Internet. Company D receives the original e-mail including a purchase order, however none of the work is actually performed by company D. Through negotiated contract, companies A, B, and C actually complete the order in stages for company D who pays them directly for each part of manufacture or service.

In current art, if a customer sends a second e-mail to company D requesting status while the parts are at the location of company A, then company D, without the aid of the present invention, would have to forward the reply to company A via e-mail, telephone, or some other media. Company D would then have to wait for a reply, then get back to the customer.

With the aid of a multi-addressable e-mail client according to the present invention, the agent representing company D may in effect substitute company A's address in the "mail-to" field of the customers e-mail request, and send it to company A as an original message from the customer. Company A would answer the e-mail and replace it's address in the "from" field with company D's address and send the reply back to the customer as an original reply. Thus, the agent at company D does not have to reply or become engaged in chasing down answers from various companies. This allows an agent to spend more time on marketing and less time on servicing.

There is another situation wherein the multi-addressability of an e-mail client as in embodiments of the present invention is very useful. This is the situation where a home agent may be enabled and connected to more than one call center, each center hosted by a different company. This agent will need the functionality of an e-mail client according to one or more embodiments of the present invention, in order to operate as though he/she is an agent of each of the call centers serviced.

Figure 2:
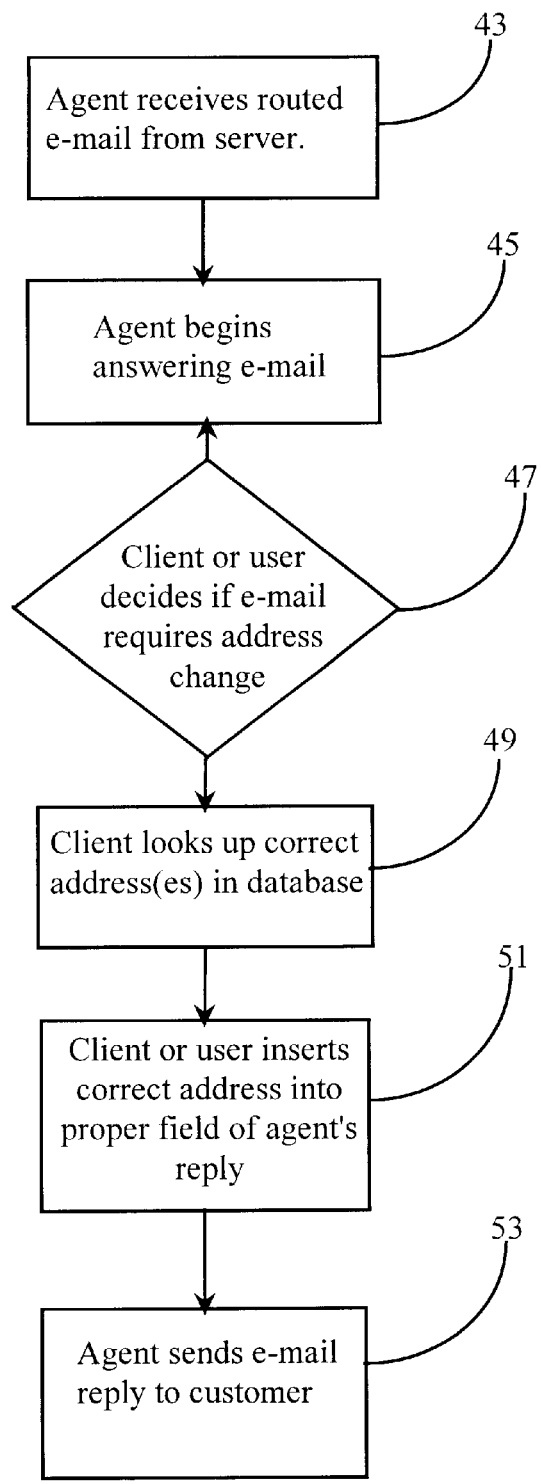
FIG. 2 is a flow chart illustrating steps in a method according to an embodiment of the present invention.

FIG. 2 is a flow chart illustrating steps taken in practicing an embodiment of the present invention. The example provided herein is meant only to show one of many variant workflow possibilities pertaining to the multi-addressable client of the present invention. Other possibilities may be inherent in other embodiments. In step 43, an agent receives an e-mail routed to him based on existing routing rules within e-mail center 9 of FIG. 1. Downloading may be automatic or initiated by the agent.

The agent begins answering the e-mail in step 45. In step 47 the agent's e-mail client decides if the reply requires an address change. This process may be initiated when the agent chooses the "reply-to" option in his client. In the event that the agent's client handles personal mail as well as company mail, the personal mail would use the client's default settings with respect to the agent's e-mail address. The determination may be made on the simple criteria of the "send-to" address of the received e-mail, or by some other data or attribute of the received e-mail.

Having determined in step 47 that the particular e-mail the agent is answering requires intervention, the client immediately looks up the correct company address or addresses in step 49. This step takes place automatically in a preferred embodiment while the agent is formulating and typing his response. Additional information may also be accessed in this step such as information regarding the status of an order, changes or revisions to order status, or other information.

In step 51 the client inserts the correct company address or addresses into the appropriate field or fields in the agent's reply. Also, other information retrieved in step 49 that may be pertinent to a customer's order could be presented to an agent in a separate dialogue box and may help the agent in formulating a response. In step 53, the agent sends the completed reply to the customer.

In an alternative embodiment steps 47 may be at the agent's discretion, and the client may present the agent with alternative addresses for insertion, or allow the agent to simply enter in variable fields in the reply form, alternative addresses.

It will be apparent to one with skill in the art that the steps described immediately above may be different for use with alternate embodiments of the present invention. It will also be apparent to one with skill in the art that the multi-addressable capability, as described herein, could be provided as a complete e-mail software program or, incorporated into existing applications as an upgrade without departing from the spirit and scope of the present invention.

It will be appreciated by the skilled artisan that there are many alternatives to the embodiments described within the spirit and scope of the invention. There are many ways, for example that alternative data may be presented to an agent or other user. There are many alternatives in ways software routines may be written while accomplishing the unique functionality of the present invention. There are similarly many other alternatives within the scope of the invention. The spirit and scope of the present invention is limited only by the claims that follow.

What is claimed is:

1. An e-mail application, comprising:

routines for providing an interactive display on a computer video monitor, the interactive display including a window for displaying a received e-mail from a sender and a window wherein a recipient may enter a reply to the sender and initiate sending of the reply;

a parser for extracting a send-to address from the received e-mail; and a look-up table stored and accessible to the e-mail application, the stored table relating send-to addresses with alternative from addresses to be inserted in the reply;

wherein the application automatically retrieves from the stored table a from address associated with the extracted send-to address, and inserts the retrieved from address in the reply replacing the existing from address, the received from address having a different physical deliverable e-mail address from the replaced from address.

2. The application of claim 1 wherein the stored table also relates words and phrases to one or more of send-to, from, and reply-to addresses, the parser reviews the body of the received e-mail for matching words and phrases to words and phrases in the table, and the application inserts any one of the send-to, from, and reply-to addresses associated with the words and phrases in the stored table in the reply to the received e-mail.

3. The application of claim 2 wherein the stored table stores complete reply messages associated with one or more of the words and phrases or addresses, and wherein the application automatically prepares and sends the reply with the prestored complete reply message and addresses in response to the received e-mail containing the selected words, phrases, or addresses.

4. The application of claim 3 wherein the stored table associates send-to addresses with alternative send-to addresses, the parser retrieves the send-to address of the received e-mail and compares same with addresses in a stored table associated with other send to addresses, and, finding a match, the application forwards the received e-mail automatically to the associated send to address in the stored table, the received send to address from the stored table having a different physical deliverable e-mail address from the send to address retrieved from the received e-mail.

5. The application of claim 4 wherein, finding a match in the stored table with the send-to address extracted from the received e-mail, the application sends a new e-mail to the associated send-to address from the table, inserting the message body of the received e-mail.

6. The application of claim 1 wherein the alternative address from the table is presented to the recipient for entry in the reply.

7. A method for preparing a reply to a received e-mail, comprising the steps of:
   (a) reviewing the received e-mail for selected addresses for comparison with alternative addresses in a stored table;
   (b) upon finding a match in the stored table, retrieving from the stored table one or more of alternative send-to, reply-to and from addresses associated with, but having a different physical deliverable e-mail address from, the selected addresses from the received e-mails, and inserting the one or more of associated alternative send-to, reply-to and from addresses into the reply to the received e-mail, thereby replacing one or more of the addresses from the received e-mail.

8. The method of claim 7 wherein, in step (a) key words, phrases, or codes in the received e-mail are used for the comparison with key words, phrases, or codes in the stored table, and in step (b) one or both of a reply-to and from addresses from the stored table, associated with the key words, phrases, or codes are inserted into the reply to the received e-mail.

9. A method for processing a received e-mail message, comprising steps of:
   (a) retrieving a send-to address from the received e-mail and comparing same to send-to addresses in a locally-stored look-up table; and
   (b) upon finding a match for the send-to address in the stored table, forwarding the received e-mail to a new send-to address associated with the received send-to address in the stored table, the new send to address having a different physical deliverable e-mail address from the send to address retrieved from the received e-mail.

10. A method for processing a received e-mail message, comprising the steps of:
   (a) retrieving a send-to address from the received e-mail and comparing same to alternative send-to addresses in a locally stored look-up table; and
   (b) upon finding a match for the retrieved send-to address in the stored table, preparing a new e-mail having the identical message of the received e-mail and a new alternative send-to address associated in the stored table with the send-to address of the received e-mail, , the new alternative send to address from the stored table having a different physical deliverable e-mail address from the send to address retrieved from the received e-mail, and maintaining the original from and reply-to addresses of the received e-mail, thereby bouncing the received e-mail transparently and automatically to a new recipient.

11. An e-mail handling system, comprising;
   a computer station having a video display unit (PC/VDU);
   an interactive display on the VDU having windows for displaying a received e-mail and for preparing a reply e-mail to the received e-mail;
   e-mail processing routines executable on the computer station, the e-mail processing routines comprising:
      a parser for extracting at least the send-to address of the received e-mail; and
      a table look-up function for perusing a stored table relating send-to addresses from the received e-mail with from addresses to be inserted in a prepared reply;
   wherein the e-mail processing routines retrieve from the stored table a from address, and inserts the retrieved address in the reply, replacing an existing from address in the received e-mail, the retrieved from address having a different physical deliverable e-mail address from the existing from address replaced in the received e-mail.

12. The system of claim 11 wherein the stored table associates first words and phrases and addresses with second words and phrases and addresses, and wherein the parser reviews the received e-mail message for words and phrases and addresses, and, finding a match with the first words and phrases and addresses in the table, inserts any one of the second words and phrases and addresses in the reply to the received e-mail.

13. The system of wherein the stored table stores complete reply messages associated with one or more of selected words, phrases, or addresses, and wherein the application automatically prepares and sends the reply with prestored messages and addresses in response to received e-mails containing the selected words, phrases, or addresses.

14. The system of claim 13 wherein the parser retrieves the send-to address of the received e-mail, compares same with addresses in a stored table associated with other send-to addresses, and, upon finding a match, the e-mail processing routines forward the received e-mail automatically to the associated send-to address in the stored table, the associated send to address from the stored table having a different physical deliverable e-mail address from the send to address in the received e-mail.

15. The system of claim 14 wherein, finding a match in the stored table with the send-to address from the received e-mail, the e-mail processing routines send a new e-mail to the associated send-to address from the table, inserting the message of the received e-mail.

16. The system of claim 11 wherein the alternative addresses are presented to the user for selection or entry in a reply.

* * * * *